United States Patent
Harasawa

(10) Patent No.: US 6,907,157 B2
(45) Date of Patent: Jun. 14, 2005

(54) METHOD AND SYSTEM FOR OPTICAL FIBER TRANSMISSION USING RAMAN AMPLIFICATION

(75) Inventor: Shin-ichirou Harasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 10/273,098

(22) Filed: Oct. 18, 2002

(65) Prior Publication Data

US 2003/0202237 A1 Oct. 30, 2003

(30) Foreign Application Priority Data

Apr. 24, 2002 (JP) ...................................... 2002-121843

(51) Int. Cl.[7] .............................. H04B 10/14; G02B 6/28
(52) U.S. Cl. .................. 385/24; 359/341.1; 359/341.2; 359/341.3; 359/341.4; 398/92
(58) Field of Search .......................... 359/341.1–341.3, 359/341.31–341.33, 341.4, 341.41, 341.42, 341.43, 341.44, 345; 398/62, 64, 91, 92, 97, 151; 385/24

(56) References Cited

U.S. PATENT DOCUMENTS

| | | |
|---|---|---|
| 2002/0015220 A1 | 2/2002 | Papernyl et al. |
| 2003/0011874 A1 * | 1/2003 | Nakamoto et al. .......... 359/334 |

FOREIGN PATENT DOCUMENTS

| | | |
|---|---|---|
| EP | 0 669 730 A2 | 8/1990 |
| EP | 0 812 078 A2 | 12/1997 |
| EP | 1 182 808 A2 | 2/2002 |
| JP | 2001-053686 | 2/2001 |
| JP | 2001-168799 | 6/2001 |

OTHER PUBLICATIONS

Communication dated Mar. 28, 2003 from the UK Patent Office including Search Report (4 pages in total).

\* cited by examiner

*Primary Examiner*—Michelle R. Connelly-Cushwa
(74) *Attorney, Agent, or Firm*—Staas & Halsey LLP

(57) ABSTRACT

In the method according to the present invention, an optical fiber transmission line for transmitting signal light is first provided. A Raman repeater 16 having a pumping source for supplying pump light propagating in a direction opposite to the direction of propagation of the signal light to the optical fiber transmission line is provided in the middle of the optical fiber transmission line. A terminal device having a similar pumping source is provided at one end of the optical fiber transmission line. A control signal is transmitted to the Raman repeater 16 by the pump light from the terminal device. The Raman repeater is controlled by the control signal transmitted. According to this method, the Raman repeater is controlled by the pump light from the terminal device provided at the receiving end, thereby eliminating a problem arising in the case of control by signal light as in the prior art.

10 Claims, 11 Drawing Sheets

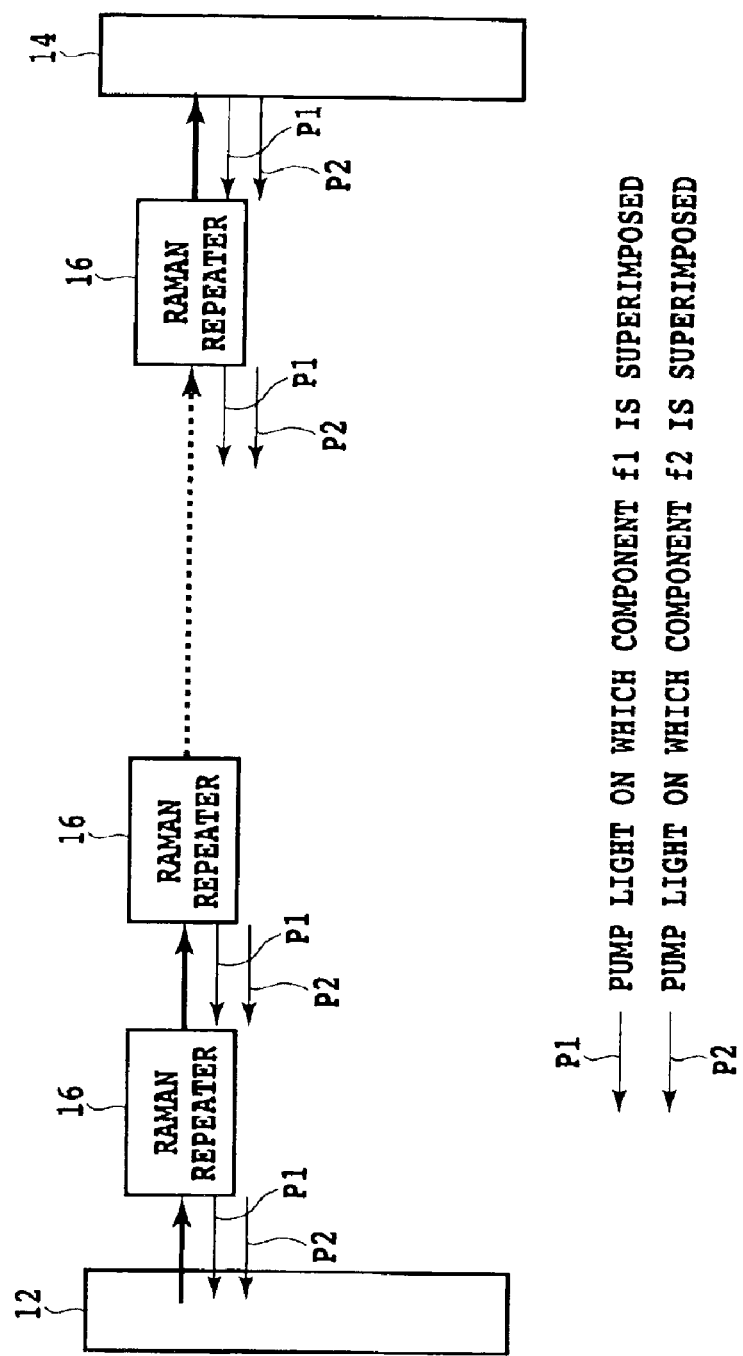

METHOD AND SYSTEM FOR OPTICAL FIBER TRANSMISSION USING RAMAN AMPLIFICATION

BACKGROUND OF THE INVENTION

1. Field of the Invention

The present invention relates to a method and system for optical fiber transmission using Raman amplification.

2. Description of the Related Art

In recent years, a manufacturing technique and using technique for a low-loss (e.g., 0.2 dB/km) silica optical fiber have been established, and an optical communication system using the optical fiber as a transmission line has been put to practical use. Further, to compensate for losses in the optical fiber and thereby allow long-haul transmission, the use of an optical amplifier for amplifying an optical signal or signal light has been put to practical use.

An optical amplifier known in the art includes an optical amplifying medium to which signal light to be amplified is supplied and means for pumping the optical amplifying medium so that the optical amplifying medium provides a gain band including the wavelength of the signal light.

For example, an erbium doped fiber amplifier (EDFA) has already been developed to amplify signal light in a 1.55 $\mu$m band where the loss in a silica fiber is low. The EDFA includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a wavelength of 1.55 $\mu$m can be obtained.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. At a receiving end, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

By using an optical amplifier as a linear repeater, the number of parts in the repeater can be greatly reduced as compared with the case of using a conventional regenerative repeater, thereby ensuring reliability and allowing a substantial cost reduction.

Recently, there has been extensively examined the application of an optical repeater using Raman amplification capable of further reducing noise and broadening the band in addition to or in place of an EDFA. In the Raman amplification, an optical fiber generally used as an optical fiber transmission line is used as an optical amplifying medium, and pump light is supplied to the optical fiber. As a pumping source used in the Raman amplification, a high-power pumping source is required. Accordingly, it is expected that a recent tendency of a laser diode (LD) to have a high power and a high efficiency can accelerate practical utilization of the optical repeater using Raman amplification. Further, also in a remote amplifying method such that pumping is performed from an end of an optical fiber transmission line without using an optical repeater, the Raman amplification using a general optical fiber as an optical amplifying medium is useful in providing a distributed amplification system.

In a Raman amplification process using a single pumping source, an obtainable gain band (a band where gain can be provided) is relatively narrow. Accordingly, a plurality of pumping sources for outputting pump lights having different wavelengths are practically used to thereby extend the gain band. However, since the Raman amplification process utilizes conversion of the power of pump light into the power of signal light, the gain that can be obtained varies according to the power of signal light included in the gain band.

For example, in the case of using Raman amplification for repeating of WDM signal light, the total power changes with a change in number of wavelength channels of the WDM signal light, causing a change in the gain that can be obtained. Specifically, in the case that two pumping sources are used, the gain given to optical signals having wavelengths included in a gain band obtained by one of the two pumping sources becomes different from the gain given to optical signals having wavelengths included in a gain band obtained by the other pumping source. As a result, there is a possibility that the transmission characteristics of optical signals obtaining a high gain may be degraded by nonlinear phenomena.

It has been proposed to prevent such a degradation in transmission characteristics by transmitting a supervisory signal to a Raman repeater by means of signal light to adjust an operational balance among a plurality of pumping sources. In this case, however, there is a limit to the number of signals transmittable because signal light is used for the transmission of the supervisory signal.

SUMMARY OF THE INVENTION

It is therefore an object of the present invention to provide a method and system which can control a Raman amplification process without using signal light to be transmitted.

Other objects of the present invention will become apparent from the following description.

In the method according to the present invention as an aspect thereof, an optical fiber transmission line for transmitting signal light is first provided. A Raman repeater having a pumping source for supplying pump light propagating in a direction opposite to the direction of propagation of the signal light to the optical fiber transmission line is provided in the middle of the optical fiber transmission line. Similarly, a terminal device having a pumping source for supplying pump light propagating in the opposite direction to the propagation direction of the signal light is provided at one end of the optical fiber transmission line. A control signal is transmitted to the Raman repeater by the pump light from the terminal device. Then, the Raman repeater is controlled by the control signal transmitted.

According to this method, the Raman repeater is controlled by the pump light from the terminal device provided at the receiving end, thereby eliminating a problem arising in the case of control by signal light as in the prior art.

In accordance with another aspect of the present invention, there is provided a system comprising an optical fiber transmission line for transmitting signal light; a Raman repeater provided in the middle of said optical fiber transmission line, said Raman repeater having a pumping source for supplying pump light propagating in a direction opposite to the direction of propagation of said signal light to said optical fiber transmission line; and a terminal device provided at one end of said optical fiber transmission line, said terminal device having a pumping source for supplying pump light propagating in the opposite direction to the propagation direction of said signal light to said optical fiber transmission line. The terminal device comprises means for transmitting a control signal to said Raman repeater by said pump light from said terminal device. The Raman repeater comprises means for controlling said Raman repeater by said control signal transmitted.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9 is a block diagram of a system for illustrating an example of the control in the case that a plurality of Raman repeaters are provided;

DETAILED DESCRIPTION OF THE PREFERRED EMBODIMENTS

Some preferred embodiments of the present invention will now be described in detail with reference to the attached drawings.

Figure 1:
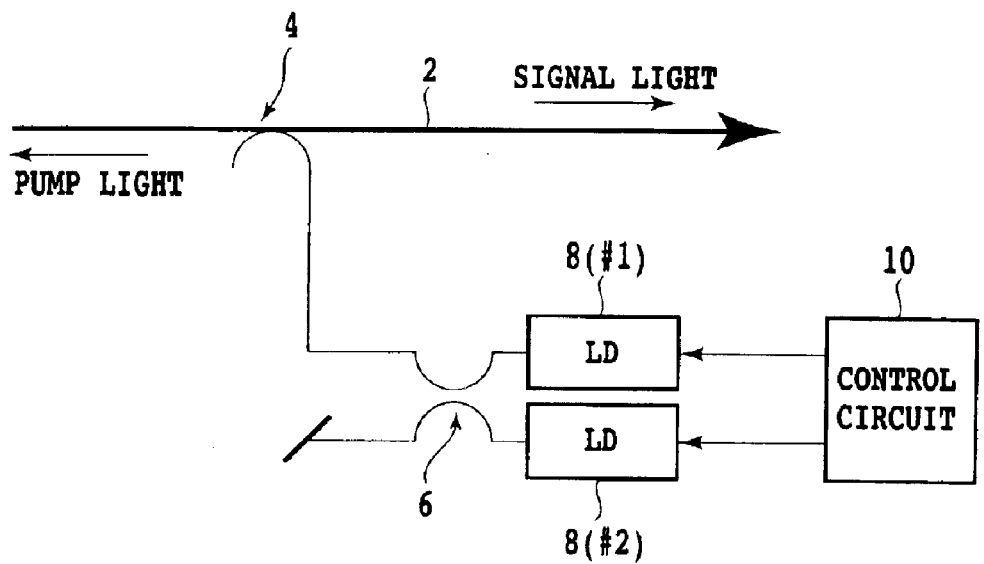
FIG. 1 is a block diagram of a Raman amplifier applicable to the present invention.

Referring to FIG. 1, there is shown a block diagram of a Raman amplifier applicable to the present invention. An optical coupler 4 is provided in the middle of an optical fiber transmission line 2. Two laser diodes (LD) 8(#1) and 8(#2) are connected through another optical coupler 6 to the optical coupler 4. Each of the laser diodes 8(#1) and 8(#2) functions as a pumping source for outputting pump light, and it is controlled by a control circuit 10 so that pump light having a constant power is output.

The pump light output from the laser diode 8(#1) and the pump light output from the laser diode 8(#2) are combined by the optical coupler 6 to enter the same optical path. The pump light thus obtained is introduced through the optical coupler 4 into the optical fiber transmission line 2 in a direction opposite to the direction of propagation of signal light. When the pump light is supplied to the optical fiber transmission line 2 along which the signal is propagating, gain is provided according to a mutual relation between the wavelength of the pump light and the wavelength of the signal light, so that the power of the pump light is converted into the power of the signal light to thereby amplify the signal light.

Figure 2:
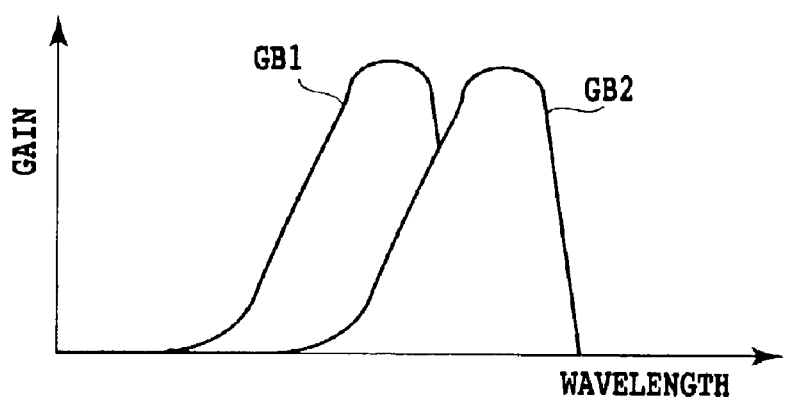
FIG. 2 is a graph for illustrating gain bands obtained by the Raman amplifier shown in FIG. 1.

Referring to FIG. 2, there are shown gain bands obtained by the Raman amplifier shown in FIG. 1. In FIG. 2, the vertical axis represents gain and the horizontal axis represents optical wavelength. The oscillation wavelengths of the laser diodes 8(#1) and 8(#2) are different from each other, so that different gain bands GB1 and GB2 are obtained. The gain band GB1 corresponding to the laser diode 8(#1) appears at shorter wavelengths, and the gain band GB2 corresponding to the laser diode 8(#2) appears at longer wavelengths. The gain that can be obtained changes according to the power of the pump light.

Figure 3A:
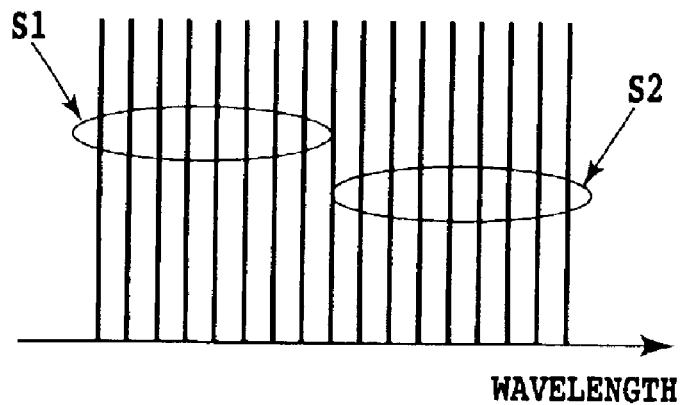
FIGS. 3A and 3B are diagrams for illustrating a change in gain when the number of wavelength channels is changed.
Figure 3B:
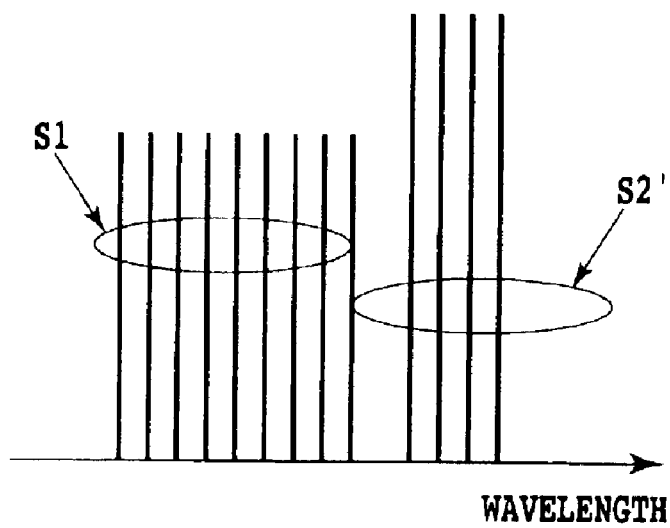

It is assumed that in the case that the number of optical signals S1 included in the gain band GB1 shown in FIG. 2 is equal to the number of optical signals S2 included in the gain band GB2 shown in FIG. 2 as shown in FIG. 3A, the output powers of the laser diodes 8(#1) and 8(#2) are adjusted so that substantially the same gain is given to the optical signals S1 and the optical signals S2. When the optical signals S2 included in the gain band GB2 decrease in number to optical signals S2' as shown in FIG. 3B, the gain given to the optical signals S2' becomes relatively high as far as the output powers of the laser diodes 8(#1) and 8(#2) are constant.

In a WDM system handling WDM signal light obtained by wavelength division multiplexing a plurality of optical signals having different wavelengths, the operation is frequently carried out in the condition where the number of optical signals is unbalanced as mentioned above, and when the gain to be given changes according to the number of optical signals as mentioned above, the transmission characteristics of optical signals having relatively high powers may be sometimes degraded by nonlinear phenomena in the fiber.

To avoid such a problem, the laser diodes 8(#1) and 8(#2) shown in FIG. 1 are remotely controlled. That is, the drive condition of the control circuit 10 is adjusted by the remote control from a terminal device connected to one end of the optical fiber transmission line 2 according to the operational conditions of the system.

Such remote control is conventionally performed by superimposing a tone signal on an optical signal and performing supervisory control with the frequency or a burst signal. However, as described above, the number of signals is sometimes limited because the tone signal is used in a gain band.

Figure 4:
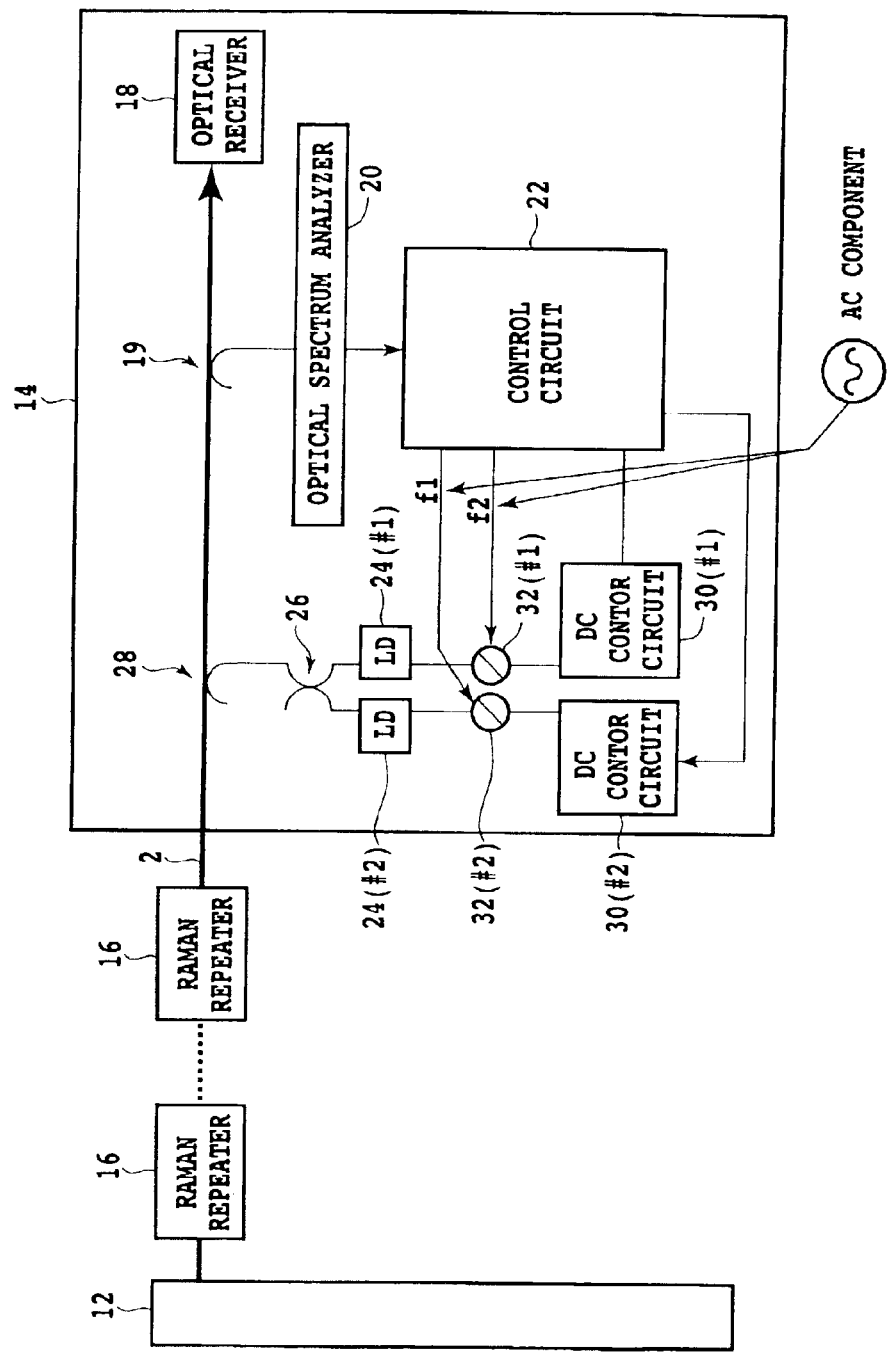
FIG. 4 is a block diagram showing a preferred embodiment of the system according to the present invention.

Referring to FIG. 4, there is shown a preferred embodiment of the system according to the present invention. This system is configured by connecting a terminal device 12 as a transmitting station to one end of the optical fiber transmission line 2 and connecting a terminal device 14 as a receiving station to the other end of the optical fiber transmission line 2. One or more Raman repeaters 16 are arranged along the optical fiber transmission line 2.

The terminal device 12 includes a plurality of optical transmitters for respectively outputting a plurality of optical signals having different wavelengths, and an optical multiplexer for wavelength division multiplexing the plurality of optical signals to output WDM signal light, which is launched into the optical fiber transmission line 2. The WDM signal light propagating along the optical fiber transmission line 2 is attenuated during the propagation. The attenuated WDM signal light is amplified by the Raman repeaters 16 so that the power of the WDM signal light is maintained until it reaches the terminal device 14. The terminal device 14 includes an optical receiver 18 for receiving the WDM signal light transmitted by the optical fiber transmission line 2, demultiplexing the WDM signal light into a plurality of optical signals, and converting these optical signals into electrical signals.

A part of the WDM signal light transmitted by the optical fiber transmission line 2 is separated off by an optical coupler 19. The spectrum of the WDM signal light separated by the optical coupler 19 is measured by an optical spectrum analyzer 20, and the result of this measurement is supplied to a control circuit 22.

In this preferred embodiment, the terminal device 14 also has a function as a Raman amplifier to compensate for the loss of the WDM signal light in the optical fiber transmission line 2 in the vicinity of the terminal device 14. More specifically, pump light from a laser diode 24(#1) as a pumping source and pump light from a laser diode 24(#2) as another pumping source are combined by an optical coupler 26 and supplied through an optical coupler 28 to the optical fiber transmission line 2 in a direction opposite to the propagation direction of the WDM signal light.

Drive currents are supplied from DC control circuits 30(#1) and 30(#2) to the laser diodes 24(#1) and 24(#2), respectively. AC superimposing circuits 32(#1) and 32(#2) are interposed between the laser diodes 24(#1) and 24(#2) and the DC control circuits 30(#1) and 30(#2), respectively. In the AC superimposing circuits 32(#1) and 32(#2), frequency components f1 and f2 from the control circuit 22 are superimposed on the drive currents for the laser diodes 24(#1) and 24(#2), respectively.

The magnitudes of the DC drive currents to be supplied from the DC control circuits 30(#1) and 30(#2) to the laser diodes 24(#1) and 24(#2) are controlled by the control circuit 22 so that the spectrum of the WDM signal light measured by the optical spectrum analyzer 20 becomes uniform, for example.

The frequency components f1 and f2 to be superimposed on the drive currents are decided according to the levels of the optical signals included in the gain bands GB1 and GB2 shown in FIG. 2, respectively, for example. Accordingly, a control signal or a supervisory signal reflecting the spectrum of the WDM signal light received by the terminal device 14 can be transmitted to the upstream side of the terminal device 14 by the pump light. That is, since the power of pump light in a Raman amplification process is high, the pump light from the terminal device 14 can be used for the supervisory control of the plural Raman repeaters 16.

Figure 5A:
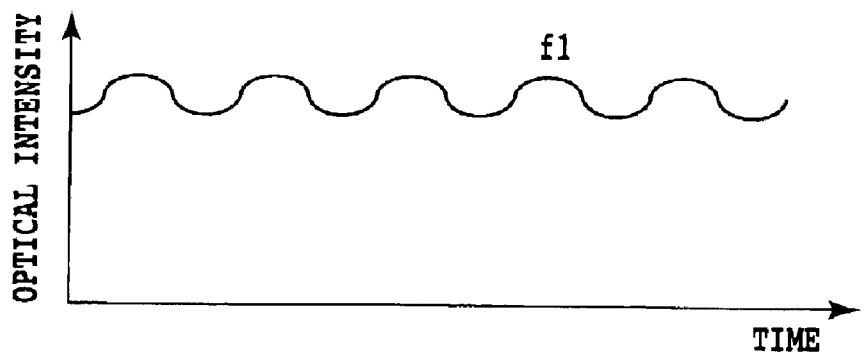
FIGS. 5A and 5B are waveform charts for illustrating frequency components to be superimposed on pump lights.
Figure 5B:
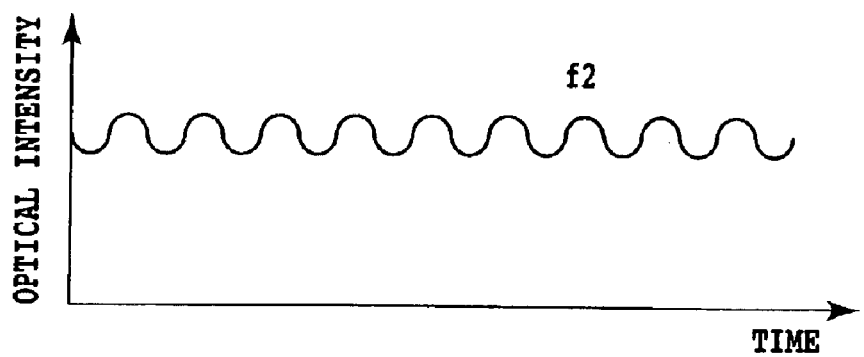

FIGS. 5A and 5B are waveform charts of the pump lights to be introduced from the laser diodes 24(#1) and 24(#2) to the optical fiber transmission line 2, respectively. As apparent from FIGS. 5A and 5B, the pump lights from the laser diodes 24(#1) and 24(#2) are amplitude-modulated (intensity-modulated) by the frequency components f1 and f2, respectively. The frequency components f1 and f2 are set to different values in different bands.

Figure 6:
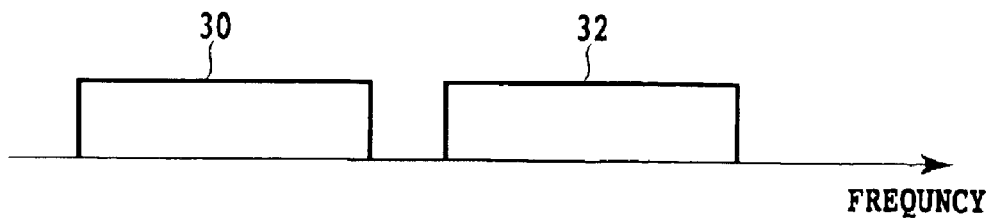
FIG. 6 is a diagram for illustrating the bands of the frequency components to be superimposed on the pump lights.

Referring to FIG. 6, there is shown an example of the ranges of presence of the frequency components f1 and f2. In this example, the frequency component f1 is set to a band of lower frequencies as shown by reference numeral 30, and the frequency component f2 is set to a band of higher frequencies as shown by reference numeral 32. The reason why the frequency components f1 and f2 are set to such different bands is to easily separate the frequency components f1 and f2 in each Raman repeater 16 (see FIG. 4) receiving the control signal transmitted by the pump light.

Figure 7:
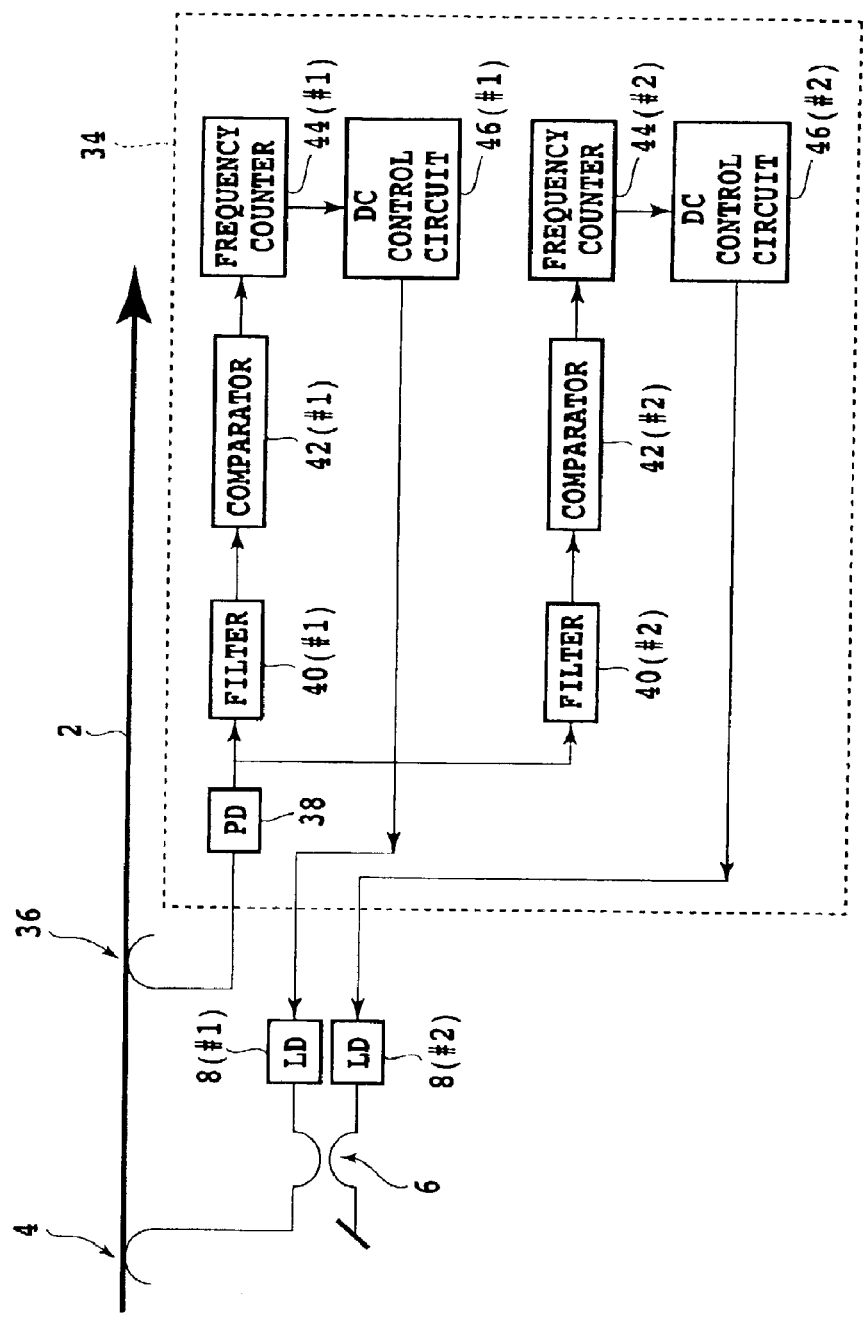
FIG. 7 is a block diagram of a Raman repeater applicable to the present invention.

FIG. 7 is a block diagram showing a preferred embodiment of the Raman repeater according to the present invention. In contrast to the configuration shown in FIG. 1, this preferred embodiment is characterized in that a supervisory control unit 34 operating according to the control signal by the pump light from the terminal device 14 (see FIG. 4) is additionally provided.

The pump light from the terminal device 14 contributes primarily to amplification of the WDM signal light in the optical fiber transmission line 2, and a part of the remaining pump light is branched off by an optical coupler 36. The pump light branched off by the optical coupler 36 is converted into an electrical signal by a photodetector (PD) 38. The output from the photodetector 38 is supplied to filters 40(#1) and 40(#2). Each of the filters 40(#1) and 40(#2) is provided by a bandpass filter. The passbands of the filters 40(#1) and 40(#2) are set so as to respectively correspond to the bands 30 and 32 shown in FIG. 6, for example.

Accordingly, the signals passed through the filters 40(#1) and 40(#2) reflect the frequency components f1 and f2, respectively. The frequency components f1 and f2 are converted into digital signals by comparators 42(#1) and 42(#2), respectively, and the values of f1 and f2 are measured by frequency counters 44(#1) and 44(#2), respectively. DC control circuits 46(#1) and 46(#2) control the drive currents for the laser diodes 8(#1) and 8(#2) as pumping sources according to the measured values f1 and f2.

Figure 8A:
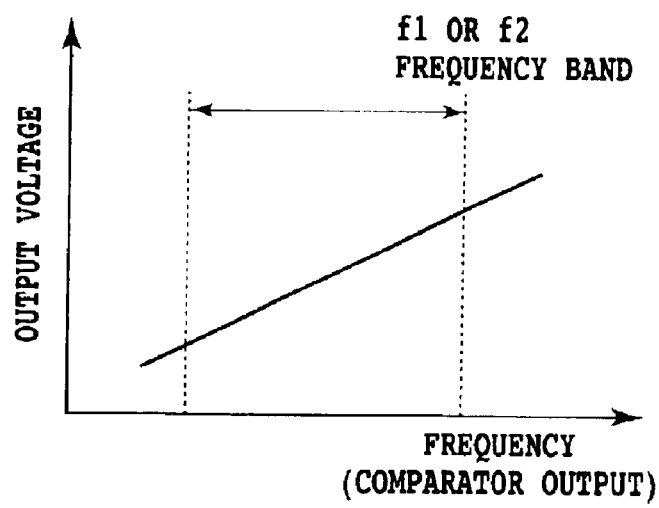
FIGS. 8A and 8B are graphs for illustrating the manner of control in the Raman repeater shown in FIG. 7.
Figure 8B:
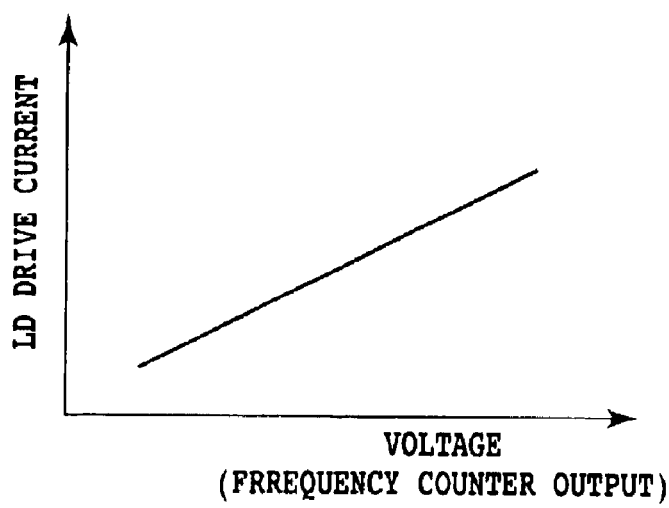

The manner of control of the drive currents for the laser diodes 8(#1) and 8(#2) will now be described with reference to FIGS. 8A and 8B. As shown in FIG. 8A, the output voltages from the frequency counters 44(#1) and 44(#2) increase with an increase in the frequencies output from the comparators 42(#1) and 42(#2). As shown in FIG. 8B, the drive currents to be supplied from the DC control circuits 46(#1) and 46(#2) to the laser diodes 8(#1) and 8(#2) increase with an increase in the output voltages from the frequency counters 44(#1) and 44(#2). Accordingly, by predetermining the relation between the spectrum measured by the optical spectrum analyzer 20 (see FIG. 4) and the frequency components f1 and f2 to be superimposed on the drive currents for the laser diodes 24(#1) and 24(#2) in consideration of the above relation shown in FIGS. 8A and 8B, the gain characteristic of each Raman repeater 16 can be controlled so that the spectrum of the WDM signal light transmitted becomes constant, for example.

An example of the control for the plural Raman repeaters 16 will now be described with reference to FIG. 9. Pump light P1 including the frequency component f1 and pump light P2 including the frequency component f2 both output from the terminal device 14 are transmitted toward the terminal device 12 by the optical fiber transmission line 2. During this transmission, the frequency components f1 and f2 are used for the control of the plural Raman repeaters 16. The manner of control of each Raman repeater 16 is similar to that described above.

Figure 10A:
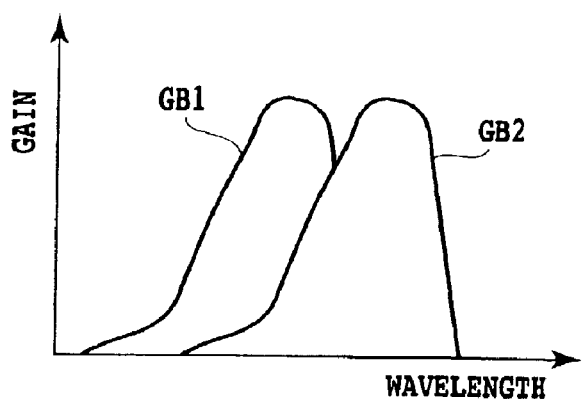
FIGS. 10A, 10B, and 10C are graphs for illustrating the control of the gain bands.
Figure 10B:
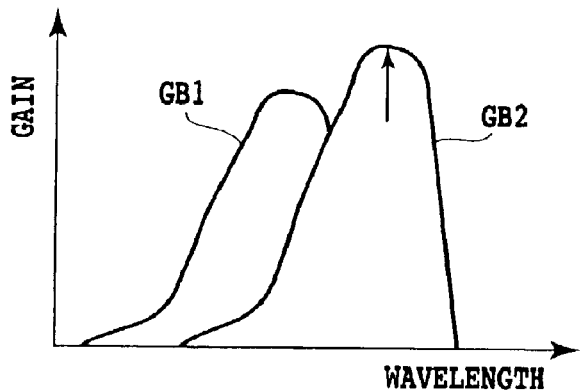
Figure 10C:
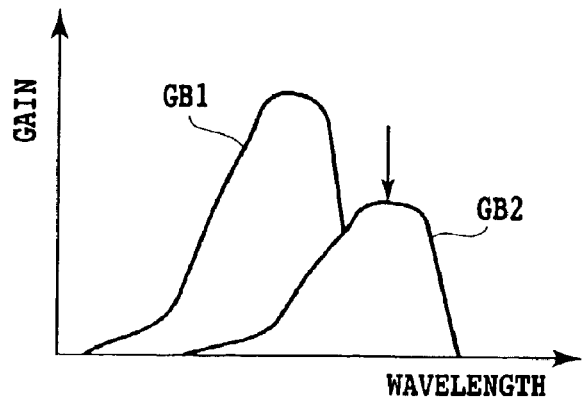

In the case that the peak gains in the gain bands GB1 and GB2 are set equal to each other as shown in FIG. 10A, for example, there is a case that the peak gain in the gain band GB2 becomes higher than the peak gain in the gain band GB1 because of a change in operational conditions or the like as shown in FIG. 10B. In this case, the peak gain in the gain band GB1 can be made relatively high by changing the frequency component f1 toward lower frequencies or by changing the frequency component f2 toward higher frequencies as shown in FIG. 10C, thereby obtaining an optimum balance between the gain bands GB1 and GB2.

Figure 11:
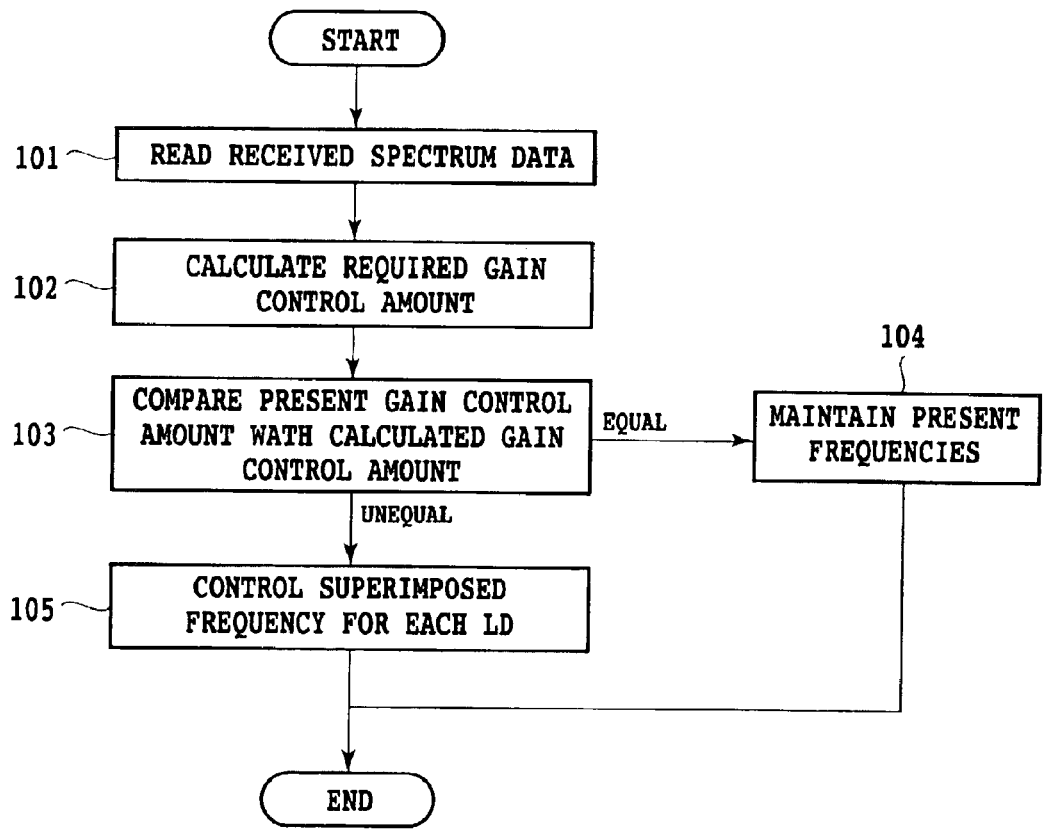
FIG. 11 is a flowchart showing the control of the gain bands.

The flow of this control will now be described more specifically with reference to FIG. 11. In step 101, spectrum data on the WDM signal light received by the terminal device 14 is read by the optical spectrum analyzer 20. In step 102, a required gain control amount is calculated. In step 103, the gain control amount calculated is compared with a present gain control amount maintained at this time. If the present gain control amount is equal to the calculated gain control amount as the result of comparison, the program proceeds to step 104 to maintain the present frequency components (f1 and f2 in the above preferred embodiment), whereas if the present gain control amount is not equal to the calculated gain control amount, the program proceeds to step 105 to change the frequency component to be superimposed on the drive current for each laser diode by a required amount.

By performing such control, a constant gain characteristic can be always obtained in each Raman repeater 16 irrespective of a change in wavelength channels of WDM signal light, for example.

Figure 12:
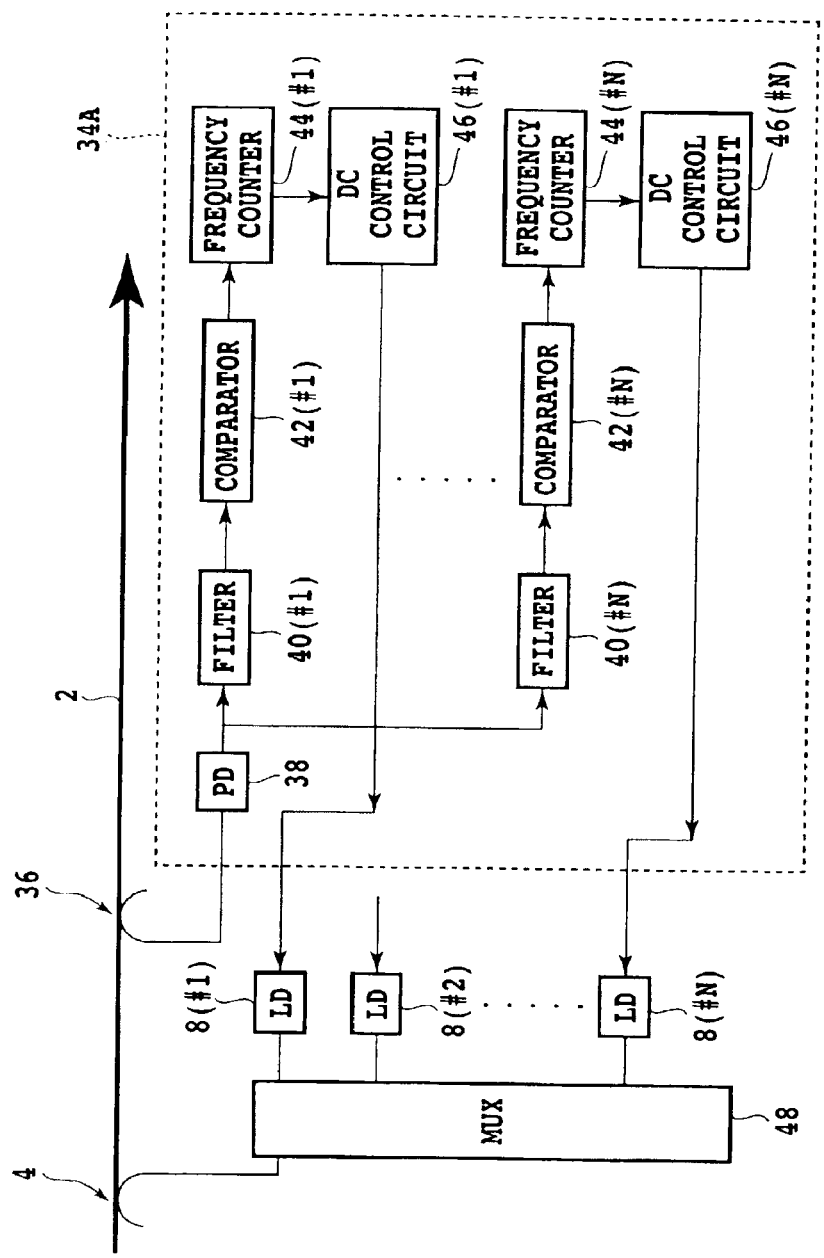
FIG. 12 is a block diagram of another Raman repeater applicable to the present invention.

FIG. 12 is a block diagram showing another preferred embodiment of the Raman repeater according to the present invention. In this preferred embodiment, a plurality of laser diodes 8(#1) to 8(#N) for outputting pump lights for pumping the optical fiber transmission line 2 are used, and the number of components included in a supervisory control unit 34A is accordingly increased. The pump lights output from the laser diodes 8(#1) to 8(#N) are wavelength division multiplexed by an optical multiplexer (MUX) 48 to obtain WDM signal light, which is in turn supplied through the optical coupler 4 to the optical fiber transmission line 2 in a direction opposite to the propagation direction of WDM signal light along the optical fiber transmission line 2.

By using N frequency components corresponding to the number N of the laser diodes 8(#1) to 8(#N) in the terminal device 14, a constant gain characteristic can be always obtained in each Raman repeater 16 irrespective of a change in wavelength channels of WDM signal light as in the previous preferred embodiment.

Figure 13:
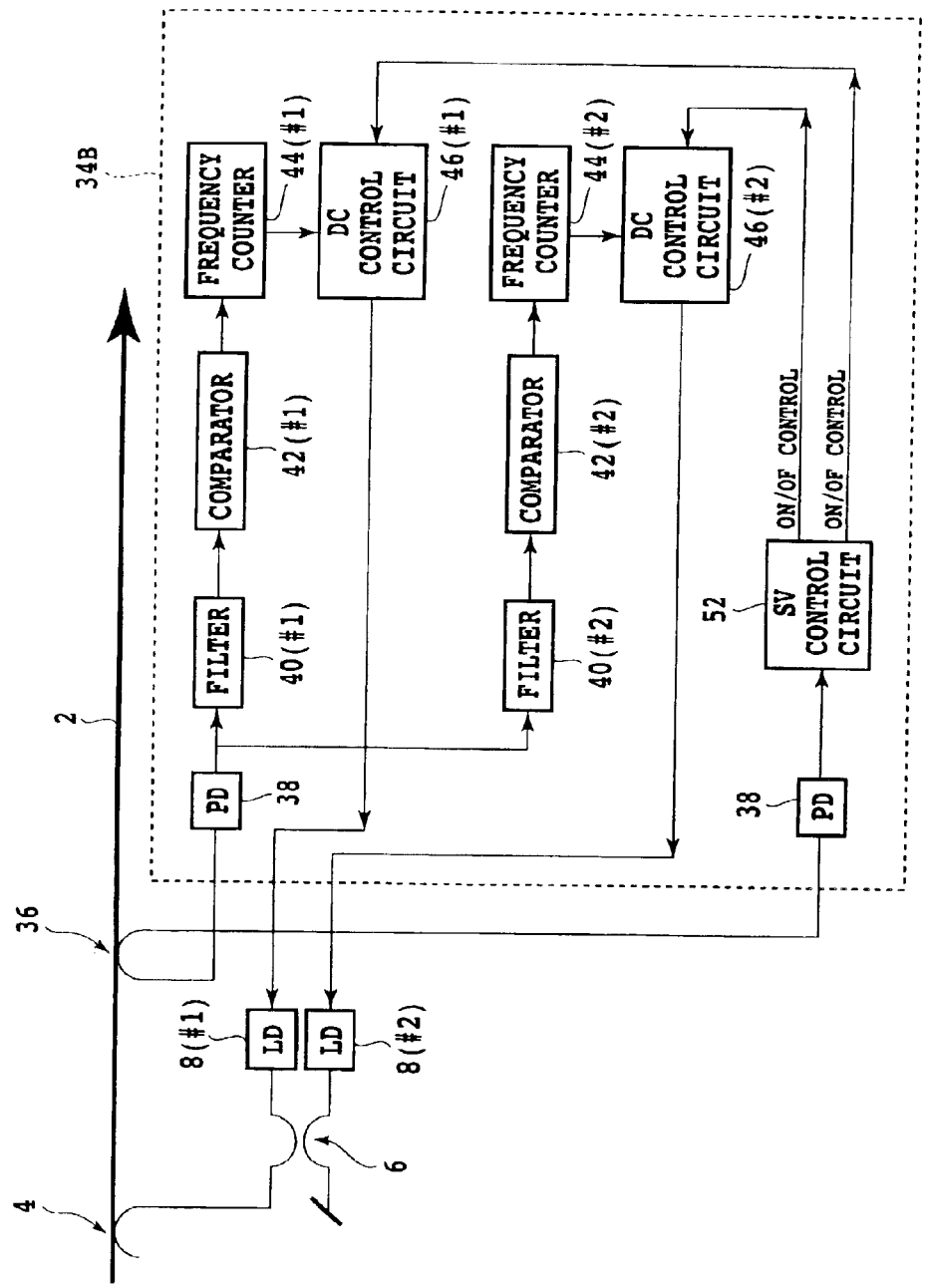
FIG. 13 is a block diagram of still another Raman repeater applicable to the present invention.

FIG. 13 is a block diagram showing a further preferred embodiment of the Raman repeater according to the present invention. This preferred embodiment includes a modification for making each Raman repeater 16 receive an SV signal (supervisory signal) from the transmitting terminal device 12. The SV signal may be generated by superimposing a tone signal on the whole or part of the WDM signal light to be transmitted.

A part of the WDM signal light transmitted by the optical fiber transmission line 2 is branched off by an optical coupler 36A and converted into an electrical signal by a photodetector 50. The electrical signal output from the photodetector 50 is supplied to an SV control circuit 52. By using this SV signal, each Raman repeater 16 can be controlled.

For example, the SV control circuit 52 sends ON/OFF control signals to the DC control circuits 46(#1) and 46(#2) according to the SV signal, thereby allowing temporary stop of the Raman amplification as required. Accordingly, it is easy to cope with abnormality of the system, for example.

In the above preferred embodiments, a plurality of frequency components for controlling the drive currents for a plurality of laser diodes are separated in the electrical stage. Alternatively, the frequency components may be separated by using optical bandpass filters, for example, in the optical stage before converting the pump light branched from the optical fiber transmission line 2 into an electrical signal by the photodetector 38.

According to the present invention as described above, it is possible to provide a method and system which can control a Raman amplification process without using signal light to be transmitted.

What is claimed is:
1. A method comprising:
providing an optical fiber transmission line for transmitting signal light;
providing a Raman repeater having a pumping source for supplying pump light propagating in a direction opposite to the direction of propagation of said signal light to said optical fiber transmission line, said pumping source comprises first and second laser diodes for respectively outputting first and second pump lights having different wavelengths;
providing a terminal device having a pumping source for supplying pump light propagating in the opposite direction to the propagation direction of said signal light to said optical fiber transmission line, at one end of said optical fiber transmission line, said pumping source comprises first and second laser diodes for respectively outputting first and second pump lights having different wavelengths;
transmitting a control signal to said Raman repeater by said pump light from said terminal device; and
controlling said Raman repeater by said control signal transmitted;
said transmitting comprises modulating said first and second pump lights in said terminal device by first and second frequency components different from each other, respectively; and
said controlling comprises the converting said pump light from said terminal device into an electrical signal and detecting said first and second frequency components according to said electrical signal.

2. A method comprising:
providing an optical fiber transmission line for transmitting signal light;
providing a Raman repeater having a pumping source for supplying pump light propagating in a direction opposite to the direction of propagation of said signal light to said optical fiber transmission line, in the middle of said optical fiber transmission line;
providing a terminal device having a pumping source for supplying pump light propagating in the opposite direction to the propagation direction of said signal light to said optical fiber transmission line, at one end of said optical fiber transmission line;
transmitting a control signal to said Raman repeater by said pump light from said terminal device; and
controlling said Raman repeater by said control signal transmitted; wherein:
said signal light is WDM signal light obtained by wavelength division multiplexing a plurality of optical signals having different wavelengths;
said transmitting comprises detecting the spectrum of said WDM signal light received by said terminal device and making said control signal reflect said spectrum detected; and said controlling includes controlling said Raman repeater so that said spectrum detected becomes constant.

3. A method according to claim 2, wherein:

each of said pumping sources of said Raman repeater and said terminal device comprises first and second laser diodes for respectively outputting first and second pump lights having different wavelengths;

said transmitting step includes the step of modulating said first and second pump lights in said terminal device by first and second frequency components different from each other according to said spectrum detected, respectively; and said controlling step includes the steps of converting said pump light from said terminal device into an electrical signal, detecting said first and second frequency components according to said electrical signal, and controlling said first and second laser diodes in said Raman repeater according to said first and second frequency components detected.

4. A method comprising:

providing an optical fiber transmission line for transmitting signal light;

providing a Raman repeater having a pumping source for supplying pump light propagating in a direction opposite to the direction of propagation of said signal light to said optical fiber transmission line, in the middle of said optical fiber transmission line;

a terminal device having a pumping source for supplying pump light propagating in the opposite direction to the propagation direction of said signal light to said optical fiber transmission line, at one end of said optical fiber transmission line;

transmitting a control signal to said Raman repeater by said pump light from said terminal device;

controlling said Raman repeater by said control signal transmitted;

providing a second terminal device for outputting a supervisory signal at another end of said optical fiber transmission line opposite to said terminal device; and controlling said Raman repeater according to said supervisory signal.

5. A method according to claim 4, wherein said supervisory signal is superimposed on said signal light.

6. A system comprising;

an optical fiber transmission line for transmitting signal light;

a Raman repeater provided in the middle of said optical fiber transmission line, said Raman repeater having a pumping source for supplying pump light propagating in a direction opposite to the direction of propagation of said signal light to said optical fiber transmission line, said pumping source comprises first and second laser diodes for respectively outputting first and second pump lights having different wavelengths; and a terminal device provided at one end of said optical fiber transmission line, said terminal device having a pumping source for supplying pump light propagating in the opposite direction to the propagation direction of said signal light to said optical fiber transmission line, said pumping source comprises first and second laser diodes for respectively outputting first and second pump lights having different wavelengths; wherein:

said terminal device includes means for transmitting a control signal to said Raman repeater by said pump light from said terminal device;

said Raman repeater includes means for controlling said Raman repeater by said control signal transmitted;

said transmitting means includes means for modulating said first and second pump lights in said terminal device by first and second frequency components different from each other, respectively; and said controlling means includes means for converting said pump light from said terminal device into an electrical signal and means for detecting said first and second frequency components according to said electrical signal.

7. A system comprising:

an optical fiber transmission line for transmitting signal light;

a Raman repeater provided in the middle of said optical fiber transmission line, said Raman repeater having a pumping source for supplying pump light propagating in a direction opposite to the direction of propagation of said signal light to said optical fiber transmission line; and a terminal device provided at one end of said optical fiber transmission line, said terminal device having a pumping source for supplying pump light propagating in the opposite direction to the propagation direction of said signal light to said optical fiber transmission line; wherein said terminal device includes means for transmitting a control signal to said Raman repeater by said pump light from said terminal device;

said Raman repeater includes means for controlling said Raman repeater by said control signal transmitted;

said signal light is WDM signal light obtained by wavelength division multiplexing a plurality of optical signals having different wavelengths;

said transmitting means includes means for detecting the spectrum of said WDM signal light received by said terminal device and means for making said control signal reflect said spectrum detected; and said controlling means includes means for controlling said Raman repeater so that said spectrum detected becomes constant.

8. A system according to claim 7, wherein:

each of said pumping sources of said Raman repeater and said terminal device comprises first and second laser diodes for respectively outputting first and second pump lights having different wavelengths;

said transmitting means includes means for modulating said first and second pump lights in said terminal device by first and second frequency components different from each other according to said spectrum detected, respectively; and said controlling means includes means for converting said pump light from said terminal device into an electrical signal, means for detecting said first and second frequency components according to said electrical signal, and means for controlling said first and second laser diodes in said Raman repeater according to said first and second frequency components detected.

9. A system comprising:

an optical fiber transmission line for transmitting signal light;

a Raman repeater provided in the middle of said optical fiber transmission line, said Raman repeater having a pumping source for supplying pump light propagating in a direction opposite to the direction of propagation of said signal light to said optical fiber transmission line;

a terminal device provided at one end of said optical fiber transmission line, said terminal device having a pumping source for supplying pump light propagating in the opposite direction to the propagation direction of said signal light to said optical fiber transmission line; and a second terminal device provided at another end of said optical fiber transmission line opposite to said terminal device for outputting a supervisory signal; wherein:

said terminal device includes means for transmitting a control signal to said Raman repeater by said pump light from said terminal device;

said Raman repeater includes means for controlling said Raman repeater by said control signal transmitted; and said Raman repeater further includes means for controlling said Raman repeater according to said supervisory signal.

10. A system according to claim 9, wherein said second terminal device includes means for superimposing said supervisory signal on said signal light.

* * * * *